United States Patent
Lee

(10) Patent No.: US 11,952,012 B2
(45) Date of Patent: Apr. 9, 2024

(54) DRIVING ASSISTANCE SYSTEM FOR VEHICLE

(71) Applicants: Hyundai Motor Company, Seoul (KR); Kia Corporation, Seoul (KR)

(72) Inventor: Dong Won Lee, Daegu (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 61 days.

(21) Appl. No.: 17/644,038

(22) Filed: Dec. 13, 2021

(65) Prior Publication Data

US 2022/0410927 A1  Dec. 29, 2022

(30) Foreign Application Priority Data

Jun. 23, 2021  (KR) .................. 10-2021-0081669

(51) Int. Cl.
*B60W 60/00* (2020.01)
*B60W 10/20* (2006.01)
(Continued)

(52) U.S. Cl.
CPC .......... *B60W 60/001* (2020.02); *B60W 10/20* (2013.01); *B60W 40/06* (2013.01);
(Continued)

(58) Field of Classification Search
CPC .... B60W 60/001; B60W 10/20; B60W 40/06; B60W 40/13; B60W 50/082;
(Continued)

(56) References Cited

U.S. PATENT DOCUMENTS

| | | | |
|---|---|---|---|
| 2016/0274235 A1* | 9/2016 | Martin | G01S 7/539 |
| 2017/0134661 A1* | 5/2017 | Chietein | B60R 1/002 |

(Continued)

FOREIGN PATENT DOCUMENTS

| | | |
|---|---|---|
| KR | 101714083 B1 | 3/2017 |
| KR | 20180026126 A | 3/2018 |
| KR | 102153148 B1 | 9/2020 |

OTHER PUBLICATIONS

Chen, K., Lu, M., Fan, X., Wei, M., & Wu, J. (Aug. 2011). Road condition monitoring using on-board three-axis accelerometer and GPS sensor. In 2011 6th International ICST conference on communications and networking in China (CHINACOM) (pp. 1032-1037). IEEE. (Year: 2011).*

*Primary Examiner* — Aniss Chad
*Assistant Examiner* — Stephanie T Su
(74) *Attorney, Agent, or Firm* — Slater Matsil, LLP

(57) ABSTRACT

An embodiment driving assistance system for a vehicle includes a driving information provision unit configured to acquire and provide driving information of a traveling vehicle, a control unit configured to generate and output a control signal for driving assistance when it is determined the vehicle travels on a rough road based on the driving information of the vehicle provided by the driving information provision unit and it is determined that the vehicle is currently in a rough road traveling state, and a steering actuator configured to generate and apply a steering assistance force according to a control value of the control signal for the driving assistance output by the control unit to a steering wheel.

18 Claims, 8 Drawing Sheets

(51) Int. Cl.
*B60W 40/06* (2012.01)
*B60W 40/13* (2012.01)
*B60W 50/00* (2006.01)
*B60W 50/08* (2020.01)
*B60W 50/14* (2020.01)
*B60W 50/16* (2020.01)
*G01S 13/931* (2020.01)
*G06V 20/56* (2022.01)
*G06V 20/58* (2022.01)

(52) U.S. Cl.
CPC .......... *B60W 40/13* (2013.01); *B60W 50/082* (2013.01); *B60W 50/16* (2013.01); *B60W 60/0051* (2020.02); *G01S 13/931* (2013.01); *G06V 20/58* (2022.01); *G06V 20/588* (2022.01); *B60W 2050/0054* (2013.01); *B60W 2050/0083* (2013.01); *B60W 2050/143* (2013.01); *B60W 2050/146* (2013.01); *B60W 2300/12* (2013.01); *B60W 2510/202* (2013.01); *B60W 2520/105* (2013.01); *B60W 2520/125* (2013.01); *B60W 2540/18* (2013.01); *B60W 2552/35* (2020.02); *B60W 2710/202* (2013.01)

(58) Field of Classification Search
CPC ............ B60W 50/16; B60W 60/0051; B60W 2050/0054; B60W 2050/0083; B60W 2050/143; B60W 2050/146; B60W 2300/12; B60W 2510/202; B60W 2520/105; B60W 2520/125; G01S 13/931; G06V 20/58; G06V 20/588
See application file for complete search history.

(56) References Cited

U.S. PATENT DOCUMENTS

2020/0001891 A1* 1/2020 Takano .................. B60W 10/20
2020/0180660 A1* 6/2020 Honda .............. B60W 60/0054
2022/0032939 A1* 2/2022 Urano ................... B60W 50/04
2022/0281456 A1* 9/2022 Giovanardi ........... G01S 7/4021
2022/0332367 A1* 10/2022 Akatsuka ............. B62D 15/025

* cited by examiner

ONE-OFF BUMPING ROUGH ROAD TRAVELING SECTION

ROUGH ROAD DETERMINATION AND STEERING CONTROL | PATH DEVIATION PREVENTION AND LINEAR TRAVELING

DRIVING ASSISTANCE SYSTEM FOR VEHICLE

CROSS-REFERENCE TO RELATED APPLICATIONS

This application claims the benefit of Korean Patent Application No. 10-2021-0081669, filed on Jun. 23, 2021, which application is hereby incorporated herein by reference.

TECHNICAL FIELD

The present disclosure relates to a driving assistance system for a vehicle.

BACKGROUND

If a vehicle travels on a rough road, an external force is applied to a vehicle wheel on a road surface from a bumpy road surface. Further, a change in a steering angle of a vehicle may occur due to the external force applied to the vehicle wheel from the road surface, and a force due to the external force and the change in the steering angle at this time is finally applied to the driver through the steering wheel.

Upon rough road traveling, the driver applies a reverse force larger than the force applied, via the vehicle wheel, to the steering wheel to prevent a path deviation of the vehicle, thereby minimizing the change in the steering angle of the vehicle.

However, the fact that the driver receives the force through the steering wheel during driving and continuously applies the force larger than the received force to the steering wheel makes the driver feel tired and stressed.

Further, for drivers of commercial vehicles exposed to constant fatigue, for example, drivers of heavy trucks or trailers, this may result in an accident such as the path deviation of the vehicle as well as increasing muscle fatigue of arms or wrists and causing injuries.

The above information disclosed in this Background section is only for enhancement of understanding of the background of the disclosure and accordingly it may include information that does not form the prior art that is already known to a person of ordinary skill in the art.

SUMMARY

The present disclosure relates to a driving assistance system for a vehicle. Particular embodiments relate to a driving assistance system, which may increase driving convenience of a driver while decreasing driving stress of the driver due to an external force applied to a steering wheel through a vehicle wheel from a road surface of a rough road, and decrease the risk of deviating from the intended path.

Therefore, embodiments of the present disclosure can solve problems associated with the related art, and an embodiment of the present disclosure provides a driving assistance system capable of solving a problem of steering stress and fatigue of a driver due to an external force applied to a steering wheel through a vehicle wheel from a road surface when the vehicle travels on a rough road.

Further, another embodiment of the present disclosure provides a driving assistance system, which may apply to a steering wheel a steering assistance force corresponding to an external force applied to a steering wheel through a vehicle wheel from a road surface of a rough road by a vehicle itself recognizing a rough road traveling state, thereby increasing driving ease of a driver and decreasing an accident risk of a path deviation.

Embodiments of the present disclosure provide a driving assistance system for a vehicle including a driving information provision unit configured to acquire and provide driving information of a traveling vehicle, a control unit configured to generate and output a control signal for driving assistance when determining whether the vehicle travels on a rough road based on the driving information of the vehicle provided by the driving information provision unit and determining that a vehicle is currently in a rough road traveling state, and a steering actuator configured to generate and apply a steering assistance force according to a control value of the control signal for the driving assistance output by the control unit to a steering wheel.

Here, the control unit may be set to determine a magnitude of an external force applied to a vehicle wheel from a road surface of a rough road, which is a traveling road, based on the driving information of the vehicle provided by the driving information provision unit when determining that the vehicle is in the rough road traveling state, and to generate and output the control signal for applying the steering assistance force, which is a reverse force with a magnitude corresponding to the determined magnitude of the external force, to the steering wheel.

Further, the driving information provision unit may include a steering angle sensor configured to detect a steering angle, which is a rotating angle of the steering wheel, and the control unit may be set to determine the magnitude of the external force as a value proportional to the steering angle using a signal of the steering angle sensor.

Further, the control unit may be set to generate and output the control signal for applying a steering assistance force, which is a reverse force with the same magnitude as the determined magnitude of the external force, to the steering wheel while the vehicle travels in an autonomous traveling mode.

Further, the control unit may be set to notify a driver that the vehicle has entered a rough road section by operating at least one of an in-vehicle display, a sound output device, and a seat vibration device when determining that the vehicle is in the rough road traveling state.

Further, the driving information provision unit may include a road surface information acquisition unit configured to acquire road surface state information of a road in the vehicle, and a sensor configured to detect vehicle state information in the vehicle.

Further, the sensor may include at least one of an acceleration sensor configured to detect a longitudinal acceleration and a lateral acceleration of the vehicle, a vehicle height sensor configured to detect a vehicle height, and a steering angle sensor configured to detect a steering angle, which is a rotating angle of the steering wheel.

Further, the control unit may be set to adjust a control value for generating the steering assistance force of the control signal according to a change amount of an acceleration detected by the acceleration sensor, a change amount of the vehicle height detected by the vehicle height sensor, or a change amount of the steering angle detected by the steering angle sensor.

Further, the control unit may use a signal value of the sensor representing the detected driving information of the vehicle, and may be set to set a predetermined first setting time as a cycle to calculate a root mean square (RMS) value of the signal value of the sensor for the first setting time, and to compare the calculated current RMS value with an RMS value for a previous first setting time to determine that the vehicle is currently in the rough road traveling state, when the comparison result satisfies a condition where a change amount of the RMS value increases or a condition where the RMS value increases by a change amount of a predetermined threshold or more.

Further, when determining that the vehicle is in the rough road traveling state, the control unit may be set to determine a recommendation speed from the signal value of the sensor, to control the in-vehicle display to display the determined recommendation speed, or to control a vehicle speed of the vehicle by setting the determined recommendation speed as a target speed.

Further, the control unit may be set to calculate a power spectrum density (PSD) value at an interval of the first setting time using the RMS value calculated from the signal value of the sensor for the first setting time, to calculate a sum power spectrum density (SPSD) value by summing and cumulating the PSD values for a predetermined second setting time, and then to determine a recommendation speed corresponding to the calculated SPSD value.

Further, the road surface information acquisition unit may include a camera mounted in the vehicle to acquire a road surface image of a traveling road, and a radar mounted in the vehicle to detect any obstacles on a road in the front of the vehicle, and the control unit may be set to determine that the vehicle is in the rough road traveling state based on information on the road surface image acquired by the camera or the obstacles detected by the radar.

Further, the road surface information acquisition unit may further include a navigation device configured to provide construction section information of the forward road on which the vehicle will travel through a traveling path set by a driver, and the control unit may be set to confirm a construction section from navigation information input by the navigation device to determine that the vehicle is in the rough road traveling state if the vehicle enters the construction section.

Further, the control unit may be set to adjust the control value for generating the steering assistance force of the control signal according to a height of the obstacle detected by the radar.

Further, the driving assistance system may further include an interface unit configured to deliver selection information and setting information input by an operation of a driver to the control unit while displaying information necessary for the driver's operation and setting for executing the driving assistance, and the control unit may be set to generate and output the control signal for the driving assistance based on the driving information of the vehicle provided by the driving information provision unit and the setting information input through the interface unit.

Here, an autonomous traveling mode is selected by the driver through the interface unit, and when determining that the vehicle is in the rough road traveling state, the control unit may be set to determine an external force applied to a vehicle wheel from a road surface of a traveling road based on the driving information of the vehicle provided by the driving information provision unit, and to generate and output a control signal for applying the steering assistance force, which is a reverse force with the same magnitude as that of the determined external force, to the steering wheel.

Further, the control unit may be set to adjust the control value for generating the steering assistance force of the control signal based on the driver information when the driver inputs and sets the driver information through the interface unit.

As a result, the driving assistance system for the vehicle according to embodiments of the present disclosure may determine whether the vehicle travels on the rough road to apply the steering assistance force corresponding to the reverse force of the external force to the steering wheel upon rough road traveling, thereby improving the problem of the steering stress and fatigue of the driver due to the external force applied through the vehicle wheel from the road surface, and increasing the driving convenience of the driver. Further, it is possible to control the vehicle speed or the torque output of the driving device upon rough road traveling, thereby decreasing the accident risk of the path deviation.

It is understood that the term "automotive", "vehicle" or "vehicular" or other similar term as used herein is inclusive of motor vehicles in general such as passenger automobiles including sports utility vehicles (SUVs), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicles is a vehicle that has two or more sources of power, for example both gasoline-powered and electric-powered vehicles.

BRIEF DESCRIPTION OF THE DRAWINGS

The above and other features of embodiments of the present disclosure will now be described in detail with reference to certain exemplary examples thereof illustrated in the accompanying drawings which are given herein below by way of illustration only, and thus are not limitative of the present disclosure, in which.

Figure 1:
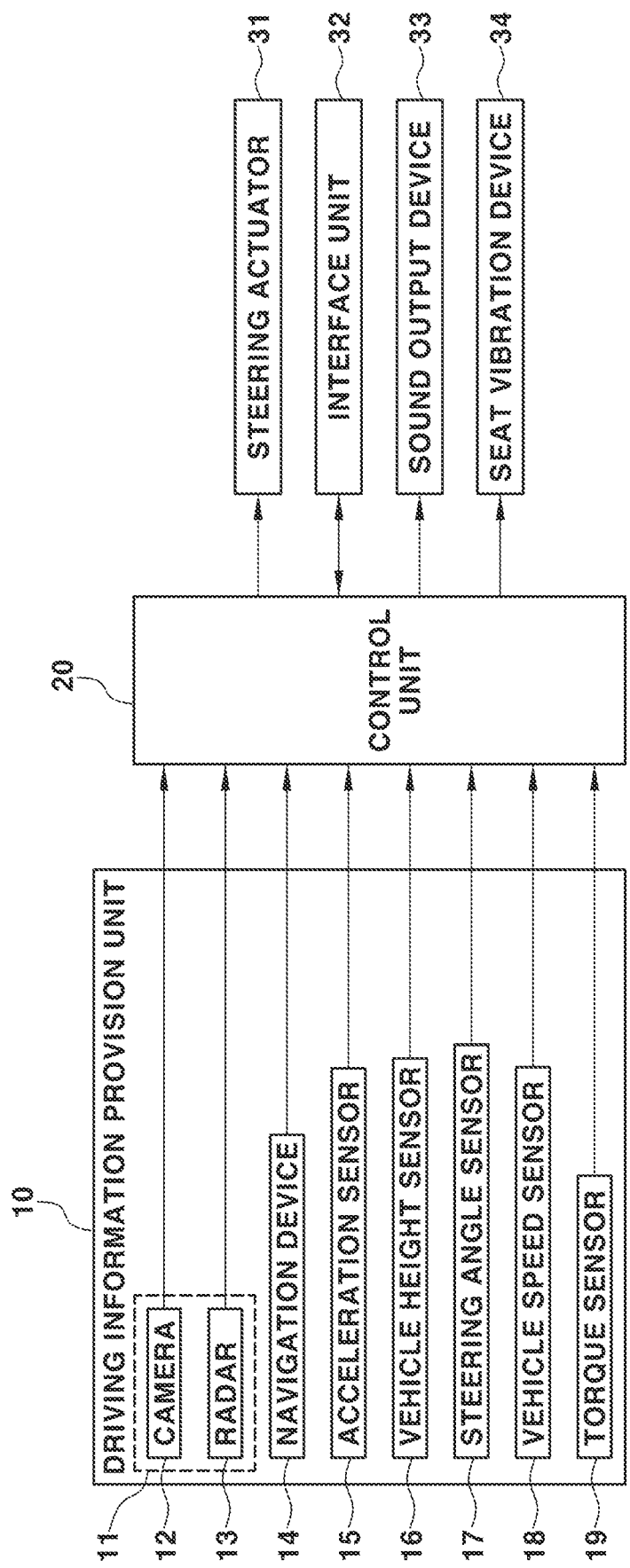
FIG. 1 is a block diagram illustrating a configuration of a driving assistance system according to an exemplary embodiment of the present disclosure.

It should be understood that the appended drawings are not necessarily to scale, presenting a somewhat simplified representation of various preferred features illustrative of the basic principles of the disclosure. The specific design features of embodiments of the present disclosure as disclosed herein, including, for example, specific dimensions, orientations, locations, and shapes will be determined in section by the particular intended application and use environment.

In the figures, reference numbers refer to the same or equivalent sections of embodiments of the present disclosure throughout the several figures of the drawing.

DETAILED DESCRIPTION OF ILLUSTRATIVE EMBODIMENTS

Specific structural or functional descriptions presented in exemplary embodiments of the present disclosure are only exemplified for the purpose of describing the exemplary embodiments according to the concept of the present disclosure, and the exemplary embodiments according to the concept of the present disclosure may be carried out in various forms. Further, the exemplary embodiments should not be interpreted as being limited to the exemplary embodiments described in the present specification, and should be understood as including all modifications, equivalents, and substitutes included in the spirit and scope of the present disclosure.

Meanwhile, in embodiments of the present disclosure, terms such as first and/or second may be used to describe various components, but the components are not limited to the terms. The terms are used only for the purpose of distinguishing one component from other components. For example, a first component may be referred to as a second component, and similarly, the second component may also be referred to as the first component, without departing from the scope according to the concept of the present disclosure.

When a component is referred to as being "connected" or "coupled" to another component, it should be understood that the components may be directly connected or coupled to each other, but still other components may also exist therebetween. On the other hand, when a component is referred to as being "directly connected to" or "in direct contact with" another component, it should be understood that there is no other component therebetween. Other expressions for describing the relationship between components, that is, expressions such as "between" and "directly between" or "adjacent to" and "directly adjacent to" should be also interpreted in the same manner.

Throughout the specification, the same reference numerals refer to the same elements. Meanwhile, the terms used in the present specification are for the purpose of describing the exemplary embodiments and are not intended to limit the present disclosure. In the present specification, the singular form also includes the plural form unless otherwise specified in the phrase. "Comprises" and/or "comprising" used in the specification specifies the presence of the mentioned component, step, operation, and/or element, and does not exclude the presence or the addition of one or more other components, steps, operations, and/or elements.

Embodiments of the present disclosure provide a driving assistance system capable of solving a problem of steering stress and fatigue of a driver due to an external force applied to a steering wheel through a vehicle wheel from a road surface upon rough road traveling of a vehicle.

More specifically, embodiments of the present disclosure provide a driving assistance system, which may apply to a steering wheel a reverse force corresponding to an external force applied to the steering wheel through a vehicle wheel from a road surface of a rough road by a vehicle itself recognizing a rough road traveling state, thereby decreasing an accident risk of a path deviation while decreasing driving stress of the driver due to the external force, and increasing driving convenience of a driver.

Embodiments of the present disclosure may be applied to a commercial vehicle such as a heavy truck or a trailer. The commercial vehicle has rapid changes in a road surface state of a traveling road or the like in many cases, compared to a general passenger vehicle. Further, the rough road traveling situation is maintained at a certain level or more and for a certain time or more in many cases, and there is a high probability that the vehicle will travel in the same situation for a certain period and the same time.

Therefore, an embodiment of the present disclosure can solve problems capable of occurring in a specialized situation of the commercial vehicle. Embodiments of the present disclosure may provide an optimized vehicle control for various situations which most drivers of the commercial vehicles face, thereby decreasing the driving fatigue of the driver.

Figure 2:
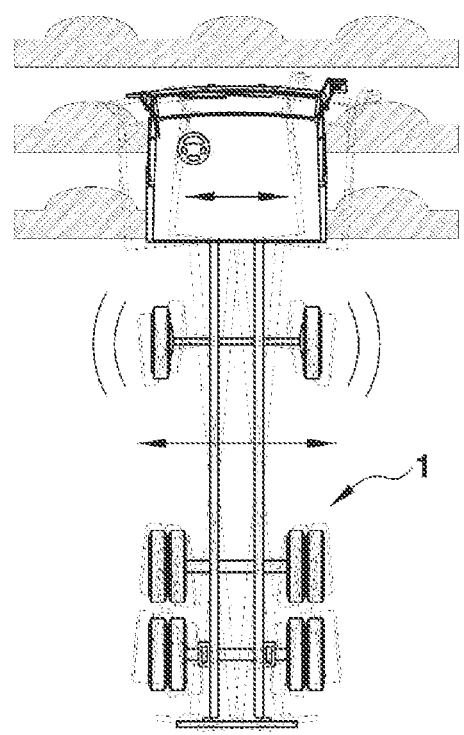
FIG. 2 is a diagram illustrating that a lateral acceleration of a vehicle may be changed by an external force applied through a vehicle wheel grounded on a road surface when the vehicle travels on a rough road.

First, FIG. 1 is a block diagram illustrating a configuration of a driving assistance system according to an exemplary embodiment of the present disclosure, and FIG. 2 is a diagram illustrating that a lateral acceleration of a vehicle may be changed by an external force applied through a vehicle wheel 1 grounded on a road surface when the vehicle travels on a rough road.

Embodiments of the present disclosure generate a reverse force corresponding to the external force using a steering actuator when a vehicle enters a rough road section, and applies a steering assistance force, which is a reverse force of the external force, to a steering wheel, thereby decreasing a driving stress due to the external force.

As illustrated, the driving assistance system according to the exemplary embodiment of the present disclosure includes a driving information provision unit 10 configured to detect or acquire and provide vehicle driving information. The vehicle driving information provided by the driving information provision unit 10 is used for the control unit 20 to determine whether a vehicle enters a rough road and travels on the rough road and a rough road state.

According to embodiments of the present disclosure, the vehicle driving information may include road information and vehicle state information, in which the road information may include road surface state information of a traveling road on which the vehicle currently travels and a forward road to travel later and event information of the forward road, and the vehicle state information may include a longitudinal acceleration and a lateral acceleration of the vehicle, a vehicle height, and a steering angle. Further, the vehicle state information may further include a vehicle speed.

Here, the road surface state information of the road includes road surface image information of the traveling road on which the vehicle currently travels and obstacle information of the forward road on which the vehicle is to travel later. To this end, according to the exemplary embodiment of the present disclosure, the driving information provision unit 10 includes a road surface information acquisition unit 11 configured to acquire the road surface state information. Further, according to the exemplary embodiment of the present disclosure, the road surface information acquisition unit 11 may be configured to include a camera 12 configured to acquire a road surface image of the traveling road and a radar 13 configured to detect the obstacle of the forward road.

The camera 12 and the radar 13 may be mounted on a front end of the vehicle, and the road surface image information and the obstacle information acquired by the camera 12 and the radar 13 are input to the control unit 20 to be described later. As a result, when real-time road surface image information of the traveling road and the obstacle information of the forward road acquired by the camera 12 and the radar 13 are input, the control unit 20 may determine whether the traveling road (current traveling road) from this information is a rough road of a certain level or more, and determine a road surface state of the forward road on which the vehicle is to travel later.

For example, the control unit 20 may confirm a height or a depth of the obstacle from the obstacle information acquired by the radar 13 and then may determine whether the obstacle, such as a continuous protrusion or groove other than the one-off protrusion or groove, is formed on the forward road in a vehicle proceeding direction using information on the height or depth of the obstacle. According to embodiments of the present disclosure, when an unevenness existing on the road surface of the forward road is sensed and an obstacle with a height of a predetermined setting value or more is sensed, the control unit 20 may adjust a control value (driving assistance value) for the driving assistance according to a height value of the sensed obstacle.

Further, the event information of the forward road includes construction section information of the forward road on which the vehicle will travel through a traveling path set by the driver, and a navigation device 14 for the vehicle may be used to receive the construction section information in the vehicle. In other words, the driving information provision unit 10 may further include the navigation device 14 configured to receive and provide the event information of the forward road on which a control target vehicle will travel through the traveling path set by the driver from a vehicle external system.

Here, the vehicle external system is an external system capable of providing the event information of the road to the vehicle, and for example, the vehicle external system may be an intelligent transportation system (ITS).

Further, the driving information provision unit 10 may further include an in-vehicle sensor configured to detect current vehicle state information, and the in-vehicle sensor may include at least one of an acceleration sensor 15 configured to detect a longitudinal acceleration and a lateral acceleration of the vehicle, a vehicle height sensor 16 configured to detect a vehicle height, and a steering angle sensor 17 configured to detect a steering angle. Further, the driving information provision unit 10 may further include a vehicle speed sensor 18 configured to detect the vehicle speed.

A signal output from each sensor is input to the control unit 20, and the control unit 20 determines a level of the rough road by recognizing a change in the vehicle acceleration upon rough road traveling from a signal of the acceleration sensor 15, and measures an operation time (i.e., rough road operation time) after determining the rough road entry. Further, the control unit 20 may sense the change in the vehicle acceleration input in the rough road situation compared to a good road for a designated time to adjust the control value for the driving assistance according to the sensed change amount.

Further, the vehicle height sensor 16 may be a level sensor of an air suspension. Generally, the air suspension for the vehicle includes a level sensor, an air tank, a control unit, a leveling valve, and an air spring. The air suspension adjusts the vehicle height, thereby improving steering stability and ride comfort. According to embodiments of the present disclosure, the control unit 20 may monitor real-time vehicle height information from a signal of the vehicle height sensor 16 to immediately recognize a change in the vehicle height upon entering the rough road larger than that of the good road traveling, and to adjust the control value for the driving assistance according to a magnitude of the change amount of the vehicle height and continuousness of the change in the vehicle height.

Further, when an external force is applied through a vehicle wheel grounded on the road surface of the traveling road, the steering angle sensor 17 detects rotating angle information of the steering wheel according to the received external force. The control unit 20 may acquire the change amount of the angle at which the steering wheel is rotated due to the external force applied through the vehicle wheel from the road surface from a signal of the steering angle sensor 17, determine whether the vehicle travels on the rough road from the magnitude of the change amount of the steering angle, and adjust the control value for the driving assistance according to the magnitude of the change amount of the steering angle.

Next, the driving assistance system according to the exemplary embodiment of the present disclosure is provided to be operable by the driver in the vehicle, and further includes an interface unit 32 configured to display information necessary for the driver's operation and setting for executing the driving assistance and to receive and deliver the driver's selection and setting value to the control unit 20.

To this end, the interface unit 32 is connected to the control unit 20, and when there are the user's operation and input of the interface unit 32, selection information and setting information according to the operation and input of the interface unit 32 may be input to the control unit 20.

According to embodiments of the present disclosure, as the interface unit 32, any means operable by the driver (user) for inputting the selection information and the setting information while displaying necessary information may be used, and for example, the interface unit 32 may be an input device and a display such as a button or a switch provided in the vehicle, an input device and a display of an audio, video, navigation (AVN) system, or a touch screen with a display function and an input function integrated therein.

Among them, if the touch screen is adopted, the interface unit 32 may include a display configured to display information for the driver's operation and setting, and a sensing unit disposed on the surface of the display to sense the user's touch to input a sensed signal to the control unit 20. According to embodiments of the present disclosure, when the touch screen of the AVN in which information display and the user's input (operation) are available is adopted as the interface unit 32, the touch screen of the AVN may be provided on a cluster for the vehicle.

Further, when the interface unit 32 is a device mounted in the vehicle, as another example, the user's operation may also be done through a mobile device such as a portable phone or a remote control unit. In other words, the interface unit 32 may include the mobile device of the user or the remote control unit. At this time, the mobile device or the remote control unit should be able to be communicably connected to the control unit 20, and to this end, an input/output communication interface for wireless connection between the mobile device and the remote control unit, and the control unit 20 is used.

Further, in the driving assistance system according to the exemplary embodiment of the present disclosure, the driver may select an autonomous traveling mode through the interface unit 32. Since several heavy trucks or trailers travel on the same road for a certain period or a certain time in many cases, several vehicles may travel together in a group in a state of entering the autonomous traveling mode.

Therefore, when the driver selects the autonomous traveling mode through the interface unit 32, an autonomous traveling control of the vehicle may be executed by an autonomous traveling module, and the vehicles may travel in the group by the driver's selection while the autonomous traveling control is executed. Upon group traveling of the vehicle, the vehicles may travel at a certain interval and a predetermined speed through a communication and cooperative control between the control units of the vehicles traveling in the group. Further, in case of an unexpected situation, if a predetermined driving operation is input by the driver, the driving control right may be transferred to the driver as the autonomous traveling mode is released.

Further, in the driving assistance system according to the exemplary embodiment of the present disclosure, the driver may input, set, or change driver (user) information through the interface unit 32. According to the exemplary embodiment of the present disclosure, the driver information, which may be set or changed through the interface unit 32, may include a driver's gender, age, driving experience, and a main purpose of use of a vehicle.

For example, when the driver executes an application in his/her portable phone wirelessly connected to the vehicle as the interface unit 32, and then inputs his/her gender, age, driving experience, and the main purpose of use of the vehicle on the executed application, the input information may be wirelessly transmitted from the portable phone to be input to the control unit 20 of the vehicle and therefore, the driver information may be set as or changed into the input information.

Figure 3:
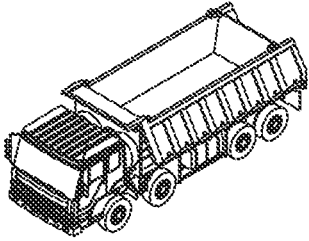
FIG. 3 is a diagram illustrating a driver information setting screen displayed by a display of an interface unit according to an exemplary embodiment of the present disclosure.

FIG. 3 illustrates a driver information setting screen displayed through the display of the interface unit 32 according to an exemplary embodiment of the present disclosure. Referring to FIG. 3, items which may be currently input and set by the driver may be displayed through the display, and the driver information (user information) of each item may be input and then stored according to a traveling vehicle type or vehicle model ('use vehicle: OO').

According to embodiments of the present disclosure, the driver information may be reflected to and used in a control process upon rough road traveling, and the control value (driving assistance value) for the driving assistance may be changed according to the driver information. Further, if the driver continuously intervenes in the corresponding situation at another force, it is possible to learn the intervening force in each situation to change the relationship of the force.

As described above, a case where the driver may selectively execute the autonomous traveling mode through the interface unit 32 and a case where the driver may set and change the driver information may additionally increase usability, practicality, and convenience according to the corresponding situation, and only one of two cases or both cases may be applied. The use and operation of the interface unit 32 will be described in detail again later.

Next, the driving assistance system according to the exemplary embodiment of the present disclosure includes the control unit 20 configured to determine the rough road traveling of the vehicle based on the vehicle driving information and setting information collected by the vehicle during traveling and to perform a driving assistance control upon rough road traveling.

More specifically, the control unit 20 determines not only a road surface state of the traveling road on which the vehicle currently travels but also a road surface state of the forward road on which the vehicle is to travel later from the vehicle driving information collected by the driving information provision unit 10 of the vehicle in real time.

At this time, based on road surface state information acquired by the road surface information acquisition unit 11 among the vehicle driving information, that is, road surface image information of the traveling road acquired by the camera 12 and obstacle height information of the forward road acquired by the radar 13, the control unit 20 determines whether the traveling road on which the vehicle currently travels is a rough road with a certain level or more, and also determines continuousness of the rough road and the height of the obstacle.

Further, the control unit 20 determines whether a construction section exists on the forward road at the current position of the vehicle through the traveling path set by the driver from the event information of the forward road among the navigation information input by the navigation device 14. Further, the control unit 20 monitors changes in the lateral acceleration and longitudinal acceleration of the vehicle from the signal of the acceleration sensor 15.

At the same time, the control unit 20 monitors the change amount (representing the change amount of the vehicle height) of the air, which flows vertically, in an air spring in the air suspension for the vehicle from the signal of the vehicle height sensor 16, and also acquires an angle at which the steering wheel is rotated by the external force applied to the vehicle wheel, that is, real-time steering angle information from the signal of the steering angle sensor 17.

Further, the control unit 20 determines whether the traveling road is the rough road or the good road based on the signal values of the acceleration sensor 15, the vehicle height sensor 16, and the steering angle sensor 17. At this time, to exclude a simple vehicle bumping or a one-off bumping situation from the rough road traveling situation, the control unit 20 may be set to monitor the signal value of each sensor for a predetermined first setting time, periodically calculate a root mean square (RMS) value for each sensor value for the first setting time by setting the first setting time as a cycle, and then to compare the calculated RMS value with an RMS value in a previous section (for a previous first setting time) to determine that the vehicle is currently in the rough road traveling state when the comparison result satisfies a condition where a change amount of the current RMS value increases, or a condition where the RMS value increases at a predetermined threshold or more.

According to the exemplary embodiment of the present disclosure, as described above, if at least one of the RMS values of the respective sensor values satisfies the conditions after the RMS value is calculated from each of the sensor values output by the plurality of sensors, the control unit 20 may determine that the vehicle enters the rough road section. For example, when all RMS values of all sensors are calculated from values of the sensor signals output by all sensors, the control unit 20 may determine that the vehicle enters the rough road section when the RMS values of one, two, or three sensors among all sensors satisfy the conditions.

Preferably, to decrease a noise factor from the signals of the sensors and increase accuracy of the determination, the control unit 20 may be set to determine that the vehicle is in the rough road traveling state only when the predetermined rough road determination condition is satisfied from the signal values of three or more sensors.

Figure 4:
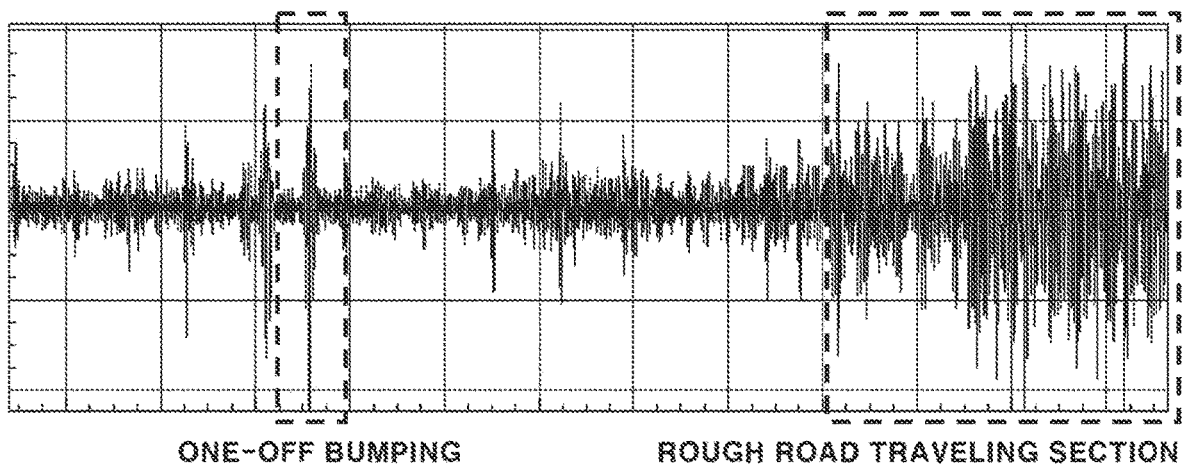
FIG. 4 is a diagram illustrating an example of a sensor value representing a one-off bumping situation and a rough road traveling section according to an exemplary embodiment of the present disclosure.

FIG. 4 is a diagram illustrating an example of the sensor value representing a one-off bumping situation and a rough road traveling section according to embodiments of the present disclosure. The control unit 20 does not determine the one-off bumping illustrated as the rough road traveling situation, calculates the RMS value of the sensor value for the first setting time, and then determines whether the vehicle enters and travels on the rough road using the calculated RMS value.

Further, according to the exemplary embodiment of the present disclosure, the control unit 20 may confirm whether the construction section exists on the forward road from the navigation information input by the navigation device 14, and determine that the vehicle enters the rough road when the vehicle enters the construction section if the construction section exists. In other words, the control unit 20 may determine the construction section as the rough road section, and perform the driving assistance control according to embodiments of the present disclosure when the vehicle enters the construction section.

Further, the control unit 20 determines information such as the vehicle speed or the height of the obstacle on the rough road acquired from the signal of the in-vehicle sensor upon rough road traveling to change the control value for the driving assistance according to the situation.

Further, the control unit 20 determines that the traveling road is the good road and terminates the control for the driving assistance if the predetermined rough road determination condition (condition where the change amount of the RMS value increases or the RMS value increases at the threshold or more) is not satisfied based on the signal value of each sensor.

Further, the driving assistance system according to the exemplary embodiment of the present disclosure may further include a steering actuator 31 configured to generate and apply the steering assistance force to the steering wheel. Embodiments of the present disclosure may be applied to a vehicle mounted with the steering actuator 31 capable of performing the instantaneous control of the force of assisting the steering force, which is a force applied to the steering wheel by the driver in the vehicle, that is, the steering assistance force. Here, the steering actuator 31 may be a steering motor (MDPS motor) in a motor driven power steering (hereinafter referred to as 'MDPS') device.

In a general MDPS device, a control unit (hereinafter referred to as 'MDPS control unit') controls an output of the steering motor based on driver steering input information and vehicle state information such that a force adjusted for the steering assistance (steering assistance force) is generated. Further, in the general MDPS device, the output control of the steering motor is performed by the MDPS control unit outputting a control instruction to control a motor current applied to the steering motor.

The MDPS control unit in the MDPS device determines an amount of current based on the information collected by the vehicle, that is, the driver steering input information and the vehicle state information and then outputs the control instruction to apply a necessary current to the steering motor, and generates the steering assistance force (steering assistance torque), which is a force for assisting the driver steering force through the driving of the motor at this time.

Further, according to the exemplary embodiment of the present disclosure, the control unit 20 of the driving assistance system may be the MDPS control unit. Of course, this is illustrative, and the present disclosure is not limited thereto. In other words, the control unit 20 of the driving assistance system may be another control unit in the vehicle other than the MDPS control unit. For example, the control unit 20 may be a vehicle control unit (VCU), which is an upper control unit for the vehicle.

Further, a plurality of control units other than a single control unit may perform the driving assistance control upon rough road traveling according to embodiments of the present disclosure through the cooperative control, and for example, the vehicle control unit (VCU) and the MDPS control unit may perform the driving assistance control upon rough road traveling. In the following description, all of a single control unit or a plurality of control units configured to perform the driving assistance control according to embodiments of the present disclosure are referred to as 'control unit'.

Figure 5:
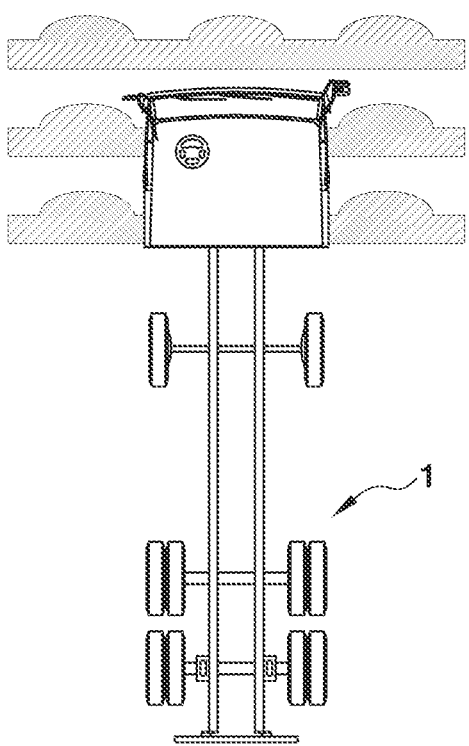
FIG. 5 is a diagram for explaining an external force state capable of being applied to a steering wheel and a control for a path deviation prevention and a linear traveling of a vehicle upon rough road traveling of the vehicle according to an exemplary embodiment of the present disclosure.
Figure 5:
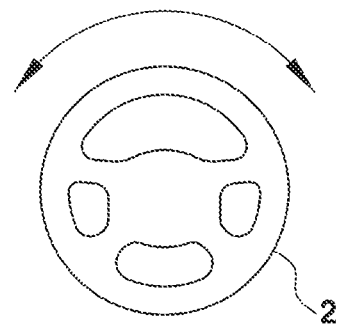

Meanwhile, FIG. 5 is a diagram for explaining an external force state capable of being applied to the steering wheel 2 upon rough road traveling of the vehicle and a state where the vehicle control is performed for the path deviation prevention and linear traveling of the vehicle according to embodiments of the present disclosure.

In the driving assistance system according to the exemplary embodiment of the present disclosure, the control unit 20 may perform a control for assisting the driver's driving, specifically, a vehicle control for preventing the path deviation of the vehicle and assisting the linear traveling of the vehicle when determining that the vehicle travels on the rough road.

According to the exemplary embodiment of the present disclosure, the vehicle control performed upon rough road traveling of the vehicle may include the steering control of the vehicle. Further, according to the exemplary embodiment of the present disclosure, the vehicle control performed upon rough road traveling of the vehicle may further include a vehicle speed control.

Here, the steering control of the vehicle may include the steering wheel sensitivity control, and the steering wheel sensitivity control may include a process of generating and applying the steering assistance force corresponding to the external force applied through the vehicle wheel from the road surface to the steering wheel. At this time, the control unit 20 controls the driving of the steering actuator 31 (e.g., steering motor) configured to generate the steering assistance force, which is a force for assisting the steering force of the driver.

In other words, according to the exemplary embodiment of the present disclosure, for the steering wheel sensitivity control, the control unit 20 calculates the magnitude of the external force applied to the vehicle through the vehicle wheel from the road surface, and then allows the force corresponding to the calculated magnitude of the external force to be applied to the steering wheel in an opposite direction of the external force. At this time, the control unit 20 controls the driving of the steering actuator 31 provided to apply the steering assistance force to the steering wheel. As described above, it is possible to apply the steering assistance force in a direction opposite to the external force (reverse force of the external force) to the steering wheel, thereby decreasing the external force which the driver feels through the steering wheel.

Here, the external force is a force applied to the steering wheel through the vehicle wheel grounded on the road surface from the road surface upon rough road traveling of the vehicle, and the magnitude of the external force may be obtained from a value proportional to the steering angle from the signal of the steering angle, which is a rotating angle of the steering wheel, that is, the signal of the steering angle sensor 17. The control unit 20 may be set to apply a low pass filter (LPF) to the signal (steering angle signal) of the steering angle sensor 17 to remove a residual vibration of a high frequency region from the signal of the steering angle sensor 17 and to separate only a signal of a low frequency band affecting the behavior of a real vehicle.

Further, the control unit controls the driving of the steering actuator 31 to calculate the magnitude of the external force received by the vehicle every moment from the signal of a low frequency band separated as described above, and then applies the force (reverse force) opposite to the external force to the steering wheel. At this time, the control value for the driving assistance may be a control instruction value output by the control unit for controlling the driving of the steering actuator 31. For example, the control value for the driving assistance may be a control instruction value output by the control unit 20 for the steering motor (MDPS motor) of the MDPS device as the steering actuator 31, and the control instruction for the steering motor may be a current instruction applied to the steering motor.

Further, upon steering wheel sensitivity control, the control unit 20 may display the information corresponding to the control value (control instruction value) for the steering actuator 31, the control state information of the steering actuator 31, or the information for the steering assistance force applied to the steering wheel through the display of the interface unit 32, such that the driver may confirm the control value information upon steering wheel sensitivity control, which is a driving assistance value.

Figure 6:
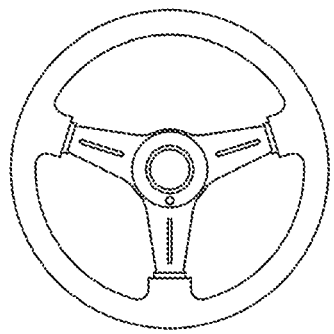
FIG. 6 is a diagram illustrating a screen representing that a steering wheel sensitivity control is performed after determining whether the vehicle enters a rough road section according to an exemplary embodiment of the present disclosure.

FIG. 6 is a diagram illustrating a screen representing that the steering wheel sensitivity control is performed after determining that the vehicle enters the rough road section according to an exemplary embodiment of the present disclosure, and as illustrated, the control unit 20 may display that the vehicle enters the rough road section and the steering wheel sensitivity control starts through the display of the interface unit 32 to notify the driver. Further, when the vehicle enters the rough road section, the control unit 20 may operate a sound output device 33 to output a warning sound or may operate a seat vibration device 34 installed on a seat to vibrate the seat, thereby informing the driver that the vehicle has entered the rough road section.

Next, for the vehicle speed control upon rough road traveling of the vehicle, the control unit 20 may calculate a sum power spectrum density (SPSD) value, determine a recommendation speed corresponding to the SPSD value using setting information from the calculated SPSD value, and then display the determined recommendation speed through the display of the interface unit 32 to recommend the determined recommendation speed to the driver. Further, the control unit 20 may control a real vehicle speed by setting the recommendation speed as a target speed. Here, the setting information may be information on which the recommendation speed is pre-set according to the SPSD value.

Table 1 below shows an example in which a range of a recommendation speed corresponding to a range of each SPSD value is set, as an example of the setting information capable of being used to determine the recommendation speed from the SPSD value.

TABLE 1

| | SPSD | | |
|---|---|---|---|
| | 0.2 or less | 0.2 to 0.3 | 0.3 or more |
| Recommendation speed | 60 km or less | 50 km or less | 40 km or less |

In the example of Table 1, the SPSD value and the recommendation speed are set in a range form, but may also be set as specific values other than the range form. Further, numeric values in Table 1 are illustrative, and the present disclosure is not limited thereto, and may be appropriately changed and tuned according to the vehicle condition or the like.

According to embodiments of the present disclosure, the SPSD value is a value obtained by summing and cumulating the PSD values obtained at a certain time (the first setting time) interval from the sensor signal for a predetermined second setting time, and the PSD value may be calculated from a signal of a predetermined sensor, for example, the steering angle sensor among the sensors.

Since a method for obtaining the PSD value from the signal in the frequency dimension is a technology well known to those skilled in the art, a specific description thereof will be omitted. Describing only a simple example, when the RMS value is obtained from the signal of the steering angle sensor, the PSD value may be determined as a value obtained by squaring the RMS value and then dividing the squared RMS value by a frequency sampling width.

As described above, when the recommendation speed is determined, for the vehicle speed control, the control unit may control the output of the driving device 40 such that the vehicle may travel at the recommendation speed using the signal of the vehicle speed sensor 18 as a feedback signal.

Here, the driving device 40 may be an engine or a motor configured to drive the vehicle, and the control unit 20 controls an engine torque or a motor torque by setting the vehicle speed as the recommendation speed. According to the exemplary embodiment of the present disclosure, upon rough road traveling of the vehicle, the control unit 20 determines a recommendation torque corresponding to the recommendation speed using the setting information from the determined recommendation speed, and then controls a torque (driving torque) of a real driving device (engine or motor) 40 by setting the determined recommendation torque as a target torque. Here, the setting information may be information in which the recommendation torque is pre-set according to the recommendation speed.

Table 2 below shows an example of the setting information capable of being used to determine the recommendation torque from the recommendation speed, and as shown, values or ranges of the recommendation torques (Tq1, Tq2, Tq3) corresponding to each recommendation speed range may be set.

TABLE 2

| | Recommendation speed | | |
|---|---|---|---|
| | 60 km or less | 50 km or less | 40 km or less |
| Recommendation torque | Tq1 | Tq2 | Tq3 |

Further, the exemplary embodiment of the present disclosure may allow the driving assistance control to be performed only when the driver turns on the driving assistance control upon rough road traveling through the interface unit 32. Further, the exemplary embodiment of the present disclosure may allow the steering wheel sensitivity control to be executed, a change to the recommendation speed to be performed, or a change to the recommendation torque to be performed through the driver feedback.

In other words, the control unit 20 controls the operation of the interface unit 32 such that a message asking whether the vehicle control including the steering wheel sensitivity control and the vehicle speed control is used and performed upon rough road traveling of the vehicle is displayed through the display of the interface unit 32 and subsequently, the vehicle control may be performed only when the driver selects the use and performance of the vehicle control through the input device of the interface unit 32.

Further, the driver may select only one of the steering control (steering wheel sensitivity control) and the vehicle speed control of the vehicle to be executed through the interface unit 32, and when one of the steering control (steering wheel sensitivity control) and the vehicle speed control is selected by the driver, the control unit 20 performs the selected control.

Further, if the autonomous traveling mode of the vehicle is selected, the rough road determination condition or the magnitude of the control value according to the rough road may be additionally adjusted. Further, when the driver information is input and set, the rough road determination condition, the magnitude of the control value according to the rough road, or the like may be additionally adjusted based on the set driver information.

More specifically, when determining that the vehicle enters the rough road in the state where the autonomous traveling mode is selected, the control unit 20 displays and provides a screen capable of selecting whether to maintain the autonomous traveling mode through the display of the interface unit 32, and allows the driver to select one of the steering control and the vehicle speed control when the driver selects the maintenance of the autonomous traveling mode.

At this time, when the steering control, that is, the steering wheel sensitivity control is selected, the control unit 20 may control the operation of the steering actuator 31 to generate and apply to the steering wheel the steering assistance force larger than that of a case where the driver grips the steering wheel by hand and directly drives and steers by a certain value or a certain rate. As a result, it is possible to control the vehicle to linearly move more clearly upon rough road traveling.

Further, when recognizing that there is a obstacle with a threshold level or more on the forward road through the road surface information acquisition unit 11, for example, when recognizing that a height of a port hole or a height of the obstacle is in a threshold situation exceeding a preset reference value, the control unit 20 may guide to the driver that the autonomous traveling mode should be released and the driving control right should be transferred to the driver by displaying or outputting the above situation through the display of the interface unit 32 or a speaker of the sound output device 33. Alternatively, the control unit 20 may notify the driver of the transfer of the driving control right by operating the vibration generation device installed on the seat to vibrate the seat.

Figure 7:
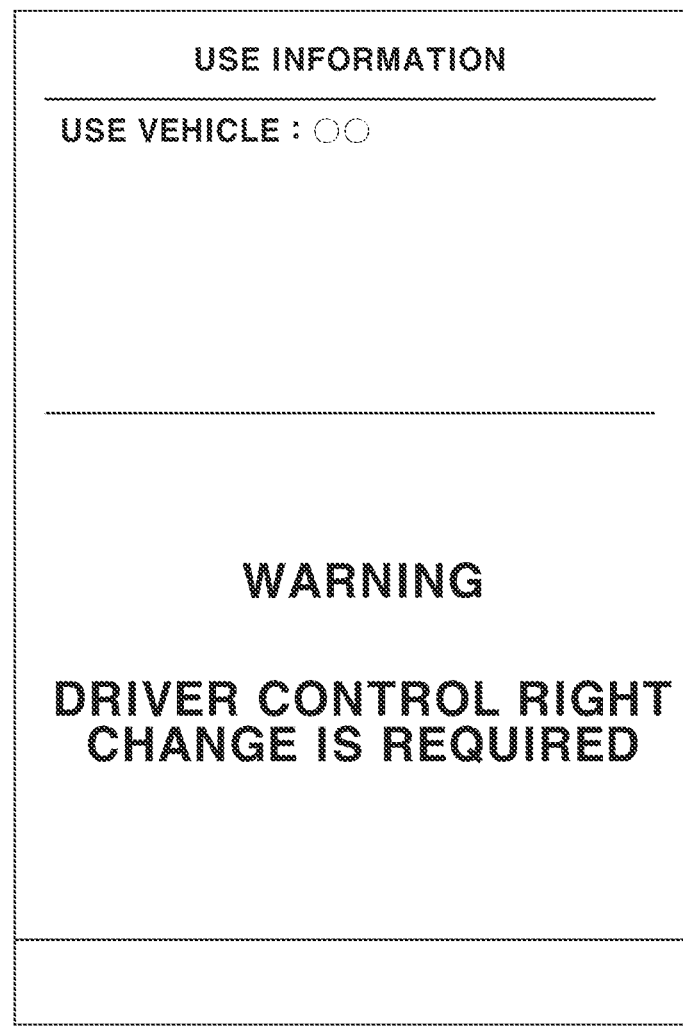
FIG. 7 is a diagram illustrating a screen guiding a change in a driving control right according to an exemplary embodiment of the present disclosure.

FIG. 7 is a diagram illustrating a screen guiding a change in the driving control right through the display of the interface unit according to an exemplary embodiment of the present disclosure.

As described above, even when two or more vehicles travel in a group in the autonomous traveling control state, the control unit 20 of a proceeding vehicle may recognize the threshold situation as described above and then guide the release of the autonomous traveling mode and the change in the driving control right (driver transfer) to the driver of the vehicle. Therefore, the driver of the proceeding vehicle may confirm the above situation and then also notify the driver of a following vehicle of the release of the autonomous traveling mode and the change in the driving control right through the vehicle movement or the like in advance.

Further, when the driver information is input and set in advance, the control unit 20 controls the operation of the steering actuator 31 to apply the steering assistance force in an opposite direction of the external force to the steering wheel as described above in a process of determining that the vehicle travels on the rough road such as a construction section and then performing the steering wheel sensitivity control, and monitors and stores the force applied to the steering wheel by the driver together with the control value at this time.

At this time, a signal of the torque sensor (reference numeral '19' in FIG. 1) configured to detect the torque corresponding to the force applied to the steering wheel by the driver, that is, the steering torque may be used, and the control unit 20 acquires real-time steering torque information applied to the steering wheel by the driver from the signal of the torque sensor 19, and then stores the steering torque information together with the steering assistance force, which is a driving assistance value (control value) upon the steering wheel sensitivity control.

As described above, the control unit 20 stores the control value (driver assistance value) of the steering actuator 31 for applying the steering assistance force with the same magnitude as that of the external force in an opposite direction of the external force to the steering wheel, and stores the steering torque corresponding to the force applied to the steering wheel by the driver upon applying the steering assistance force in the steering wheel sensitivity control process.

Further, as described above, when applying the steering assistance force to the steering wheel, the control unit 20 stores and learns the value of the steering torque applied to the steering wheel by the driver as a value matched with the steering assistance force together with the corresponding driver information, and thereafter, the control unit 20 may reflect the learned result to adjust the control value in correspondence with the steering torque upon applying the steering assistance force.

As a result, in a case where the driver continuously intervenes in the same situation at another force, it is possible to change the relationship between the intervened force and the steering assistance force by learning the intervening force (steering torque).

Further, if the autonomous traveling mode is selected by the driver, the control unit 20 may apply the reverse force with the same magnitude as that of the external force calculated from the signal of the steering angle sensor 17 to the steering wheel through the steering actuator 31 such that the vehicle may linearly travel in the rough road section.

On the other hand, if the autonomous traveling mode is not selected and the driver has the driving control right, the control unit 20 may control the driving of the steering actuator 31 to apply the reverse force with the magnitude adjusted at a predetermined rate from the magnitude of the external force to the steering wheel. At this time, the magnitude of the reverse force applied to the steering wheel may be a value obtained by multiplying a gain value by the magnitude of the external force, in which the gain value may be a value selected by the driver or a value according to the driver information previously input and set by the driver. Therefore, upon steering wheel sensitivity control, the reverse force which has the magnitude corresponding to the magnitude of the external force and is adjusted according to the driver input value or the driver information may be applied to the steering wheel.

As described above, the configuration of the driving assistance system according to the exemplary embodiments of the present disclosure has been described in detail, and hereinafter, a process of executing the driving assistance will be described with reference to the drawing.

Figure 8:
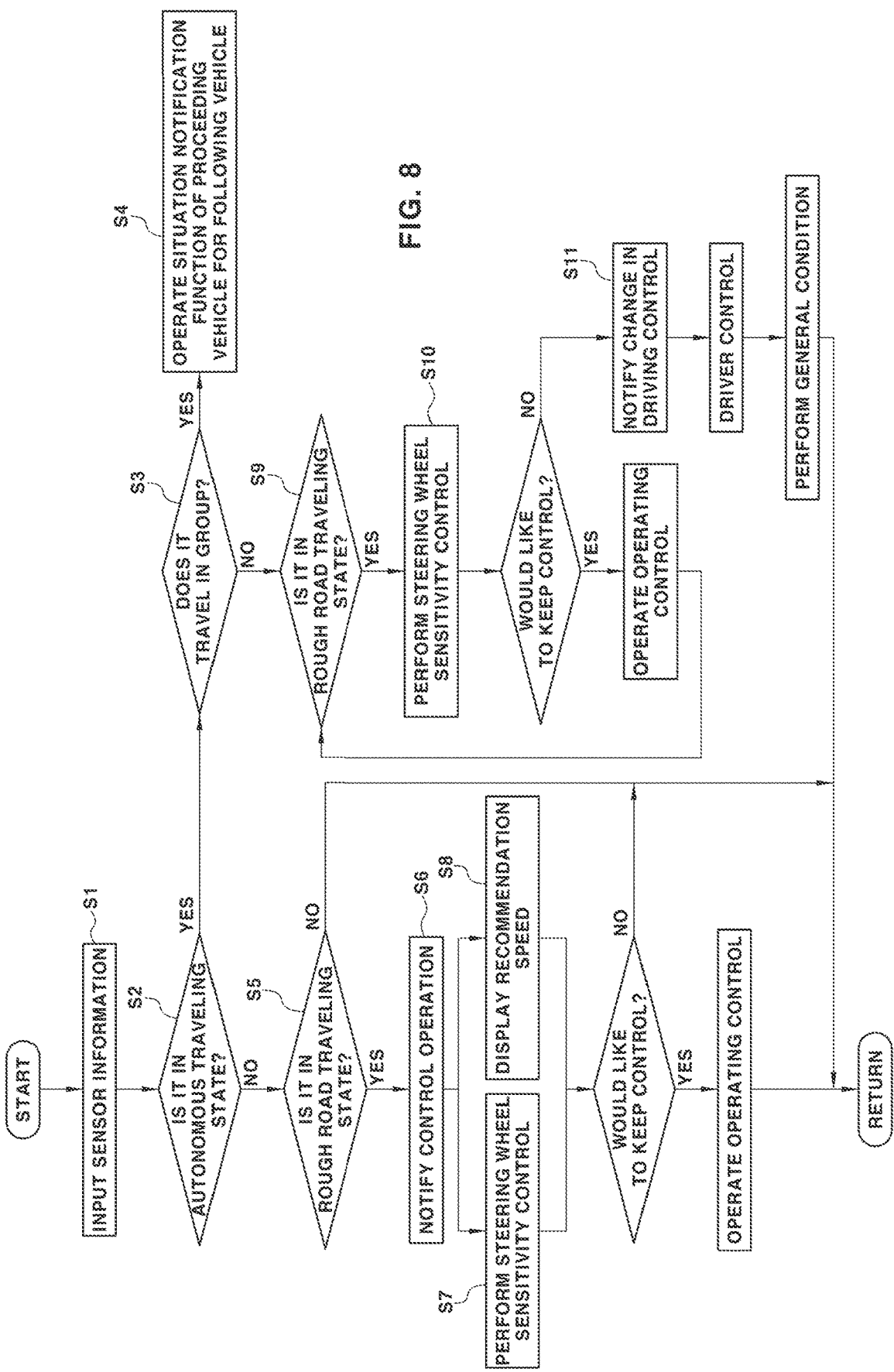
FIG. 8 is a flowchart illustrating a driving assistance process according to an exemplary embodiment of the present disclosure.

FIG. 8 is a flowchart illustrating a driving assistance process according to an exemplary embodiment of the present disclosure, and since the driving assistance process has also been sufficiently described when the configuration of the driving assistance system is described above in detail, hereinafter, a simple example of the driving assistance process will be sequentially described and summarized with reference to FIG. 8.

First, various information necessary for the driving assistance control is collected by the sensors of the driving information provision unit 10 during traveling in the vehicle (S1). Further, the control unit 20 for the vehicle performs a control for performing an alarm function alarming to other vehicles a case where the autonomous traveling mode or the group traveling mode is released or the driving control right is changed during traveling of the corresponding vehicle (control target vehicle) in the state where the autonomous traveling mode and the group traveling mode are selected by the driver (S2, S3, S4).

The group traveling may be performed when several vehicles travel, and means that a plurality of vehicles travel while maintaining a certain interval and the same speed in the state where the autonomous traveling mode is selected, and upon group traveling, the control units mounted in the plurality of vehicles perform a cooperative control for the group traveling of the vehicle while exchanging necessary information through communication.

Further, as described above, if the autonomous traveling mode or the group traveling mode is released or the driving control right is changed during the group traveling, the control unit 20 may notify the control units of other vehicles that the autonomous traveling mode or the group traveling mode is released or the driving control right is changed through communication. Further, if the proceeding vehicle among the vehicles traveling in the group determines that the vehicle enters the rough road, the control unit of the proceeding vehicle may inform the control unit of the following vehicle that the vehicle enters the rough road through communication.

Further, when the vehicle is not in the autonomous traveling state, whether the vehicle enters the rough road section based on the sensor information collected by the vehicle (S5), and when the vehicle enters the rough road section, the fact that the operation of the vehicle control for driving assistance starts is guided to the driver visually and audibly through the display of the interface unit 32 or the sound output device 33 (S6).

Subsequently, the control unit 20 may perform the steering wheel sensitivity control if the driver selects the execution of the driving assistance control through the interface unit 32 (S7), display the recommendation speed through the display (S8), or control the torque of the driving device (engine or motor) such that the real vehicle speed is controlled at the recommendation speed.

Further, when the vehicle enters the rough road section in the autonomous traveling state but the non-group traveling state (including a single traveling state) (S2, S3, S9), the control unit 20 performs the steering wheel sensitivity control (S10), and subsequently, if the driver releases the autonomous traveling control, the change in the driving control right is notified to the driver through the interface unit 32 or the sound output device 33 (S11).

As described above, according to the driving assistance system according to embodiments of the present disclosure, in the rough road traveling condition where the driver has the difficulty in steering due to the external force applied to the vehicle wheel (tire) for the vehicle, the control unit may recognize that the vehicle enters the rough road and then guide the rough road traveling situation to the driver, and perform the vehicle control such as the steering control and vehicle speed control of the vehicle, thereby decreasing the risk of the target path deviation of the vehicle upon rough road traveling and decreasing fatigue applied to the driver's body.

Further, embodiments of the present disclosure may allow whether the steering control is operated and the level of the steering force to be displayed on the in-vehicle display, thereby allowing the driver to recognize the vehicle steering control situation and allowing the driver to control the vehicle behavior by the steering control, when necessary.

While the exemplary embodiments of the present disclosure have been described above in detail, the claims of the present disclosure are not limited thereto, and various changes and improvements of those skilled in the art using the basic concept of the present disclosure defined by the appended claims are also included in the claims of the present disclosure.

What is claimed is:

1. A driving assistance system for a vehicle, the driving assistance system comprising:
   a driving information provision unit configured to acquire and provide driving information of a traveling vehicle;
   a control unit configured to generate and output a control signal for driving assistance when it is determined the vehicle travels on a rough road based on the driving information of the vehicle provided by the driving information provision unit and it is determined that the vehicle is currently in a rough road traveling state; and
   a steering actuator configured to generate and apply a steering assistance force according to a control value of the control signal for the driving assistance output by the control unit to a steering wheel,
   wherein the control unit is configured:
   to calculate a power spectrum density (PSD) value at an interval of a first setting time using a root mean square (RMS) value calculated from a signal value of a sensor for the first setting time, wherein the sensor is configured to detect vehicle state information of the vehicle,
   to calculate a sum power spectrum density (SPSD) value by summing and cumulating the PSD values for a predetermined second setting time, and
   to determine a recommendation speed corresponding to the calculated SPSD value.

2. The driving assistance system of claim 1, wherein the control unit is configured:
   to determine a magnitude of an external force applied to a vehicle wheel from a road surface of the rough road, which is a traveling path, based on the driving information of the vehicle provided by the driving information provision unit when it is determined that the vehicle is in the rough road traveling state; and
   to generate and output the control signal for applying the steering assistance force, which is a reverse force with a magnitude corresponding to the determined magnitude of the external force, to the steering wheel.

3. The driving assistance system of claim 2, wherein the driving information provision unit comprises a steering angle sensor configured to detect a steering angle, which is a rotating angle of the steering wheel.

4. The driving assistance system of claim 3, wherein the control unit is configured to determine the magnitude of the external force as a value proportional to the steering angle using a signal of the steering angle sensor.

5. The driving assistance system of claim 2, wherein the control unit is configured to generate and output the control signal for applying a steering assistance force, which is a reverse force with the same magnitude as the determined magnitude of the external force, to the steering wheel while the vehicle travels in an autonomous traveling mode.

6. The driving assistance system of claim 1, wherein the control unit is configured to notify a driver that the vehicle has entered a rough road section by operating an in-vehicle display, a sound output device, or a seat vibration device when it is determined that the vehicle is in the rough road traveling state.

7. A driving assistance system for a vehicle, the driving assistance system comprising:
a driving information provision unit configured to acquire and provide driving information of a traveling vehicle, wherein the driving information provision unit comprises:
a road surface information acquisition unit configured to acquire road surface state information of a road traveled by the vehicle; and
a sensor configured to detect vehicle state information of the vehicle;
a control unit configured to generate and output a control signal for driving assistance when it is determined the vehicle travels on a rough road based on the driving information of the vehicle provided by the driving information provision unit and it is determined that the vehicle is currently in a rough road traveling state; and
a steering actuator configured to generate and apply a steering assistance force according to a control value of the control signal for the driving assistance output by the control unit to a steering wheel,
wherein the control unit is configured:
to calculate a power spectrum density (PSD) value at an interval of a first setting time using an RMS value calculated from a signal value of the sensor for the first setting time,
to calculate a sum power spectrum density (SPSD) value by summing and cumulating the PSD values for a predetermined second setting time, and
to determine a recommendation speed corresponding to the calculated SPSD value.

8. The driving assistance system of claim 7, wherein the sensor comprises:
an acceleration sensor configured to detect a longitudinal acceleration and a lateral acceleration of the vehicle;
a vehicle height sensor configured to detect a vehicle height; or
a steering angle sensor configured to detect a steering angle, which is a rotating angle of the steering wheel.

9. The driving assistance system of claim 8, wherein the control unit is configured to adjust a control value for generating the steering assistance force of the control signal according to a change amount of an acceleration detected by the acceleration sensor, a change amount of the vehicle height detected by the vehicle height sensor, or a change amount of the steering angle detected by the steering angle sensor.

10. The driving assistance system of claim 7, wherein the control unit is configured:
to use the signal value of the sensor representing the detected driving information of the vehicle;
to calculate the root mean square (RMS) value of the signal value of the sensor for the first setting time as predetermined as a cycle; and
to compare the calculated current RMS value with an RMS value for a previous first setting time to determine that the vehicle is currently in the rough road traveling state when the comparison result satisfies a condition where a change amount of the RMS value increases or a condition where the RMS value increases by a change amount of a predetermined threshold or more.

11. The driving assistance system of claim 10, wherein, when it is determined that the vehicle is in the rough road traveling state, the control unit is configured to determine a recommendation speed from the signal value of the sensor.

12. The driving assistance system of claim 11, wherein the control unit is configured:
to control an in-vehicle display to display the determined recommendation speed; or
to control a vehicle speed of the vehicle by setting the determined recommendation speed as a target speed.

13. The driving assistance system of claim 7, wherein the road surface information acquisition unit comprises:
a camera mounted in the vehicle, the camera configured to acquire a road surface image of a traveling road; and
a radar mounted in the vehicle, the radar configured to detect any obstacles on a road in front of the vehicle,
wherein the control unit is configured to determine that the vehicle is in the rough road traveling state based on information on the road surface image acquired by the camera or the obstacles detected by the radar.

14. The driving assistance system of claim 13, wherein the road surface information acquisition unit further comprises a navigation device configured to provide construction section information of the road on which the vehicle is to travel through a traveling path set by a driver, and wherein the control unit is configured to confirm a construction section from navigation information input by the navigation device to determine that the vehicle is in the rough road traveling state when the vehicle enters the construction section.

15. The driving assistance system of claim 13, wherein the control unit is configured to adjust the control value for generating the steering assistance force of the control signal according to a height of the obstacle detected by the radar.

16. A driving assistance system for a vehicle, the driving assistance system comprising:
a driving information provision unit configured to acquire and provide driving information of a traveling vehicle;
a control unit configured to generate and output a control signal for driving assistance when it is determined the vehicle travels on a rough road based on the driving information of the vehicle provided by the driving information provision unit and it is determined that the vehicle is currently in a rough road traveling state;
a steering actuator configured to generate and apply a steering assistance force according to a control value of the control signal for the driving assistance output by the control unit to a steering wheel; and
an interface unit configured to deliver selection information and setting information input by an operation of a driver to the control unit while displaying information necessary for the driver's operation and for executing the driving assistance, wherein the control unit is configured to generate and output the control signal for the driving assistance based on the driving information of the vehicle provided by the driving information provision unit and the setting information input through the interface unit, and wherein the control unit is configured:
- to calculate a power spectrum density (PSD) value at an interval of a first setting time using an RMS value calculated from a signal value of a sensor for the first setting time, wherein the sensor is configured to detect vehicle state information of the vehicle,
- to calculate a sum power spectrum density (SPSD) value by summing and cumulating the PSD values for a predetermined second setting time, and
- to determine a recommendation speed corresponding to the calculated SPSD value.

17. The driving assistance system of claim 16, wherein, in an autonomous traveling mode selected by the driver through the interface unit, when it is determined that the vehicle is in the rough road traveling state, the control unit is configured:
- to determine an external force applied to a vehicle wheel from a road surface of a traveling road based on the driving information of the vehicle provided by the driving information provision unit; and
- to generate and output a control signal for applying the steering assistance force, which is a reverse force with the same magnitude as that of the determined external force, to the steering wheel.

18. The driving assistance system of claim 16, wherein the control unit is configured to adjust the control value for generating the steering assistance force of the control signal based on the driver information when the driver inputs and sets the driver information through the interface unit.

* * * * *